United States Patent
Wiseman et al.

(10) Patent No.: US 6,810,470 B1
(45) Date of Patent: Oct. 26, 2004

(54) MEMORY REQUEST INTERLOCK

(75) Inventors: John R. Wiseman, Newtown, PA (US); Glen Timothy McDonnell, Holland, PA (US)

(73) Assignee: ATI Technologies, Inc., Markham (CA)

( * ) Notice: Subject to any disclaimer, the term of this patent is extended or adjusted under 35 U.S.C. 154(b) by 727 days.

(21) Appl. No.: 09/638,550

(22) Filed: Aug. 14, 2000

(51) Int. Cl.[7] .............................................. G06F 12/14
(52) U.S. Cl. ........................................ 711/163; 711/156
(58) Field of Search ............................... 711/158, 141, 711/144, 145, 146, 163, 167, 151, 152

(56) References Cited

U.S. PATENT DOCUMENTS

| | | | | |
|---|---|---|---|---|
| 5,418,973 A | * | 5/1995 | Ellis et al. ................ | 711/202 |
| 5,432,918 A | * | 7/1995 | Stamm ...................... | 710/112 |
| 5,778,413 A | * | 7/1998 | Stevens et al. ......... | 365/189.01 |
| 5,895,492 A | * | 4/1999 | Greenspan et al. ......... | 711/147 |
| 6,009,426 A | * | 12/1999 | Jouenne et al. ............ | 707/8 |
| 6,145,052 A | * | 11/2000 | Howe et al. ............... | 710/43 |
| 6,279,050 B1 | * | 8/2001 | Chilton et al. ............. | 710/104 |

* cited by examiner

*Primary Examiner*—Matthew Kim
*Assistant Examiner*—Matthew D. Anderson
(74) *Attorney, Agent, or Firm*—Volpe and Koenig, P.C.

(57) ABSTRACT

A memory controller for use in a computer system. The controller has a buffer having an input configured to receive read and write requests. Each request has an associated memory address. For a selected received request, prior received requests out of a set of the received requests are determined. For each determined prior received request, that request's memory address is compared to the selected request's memory address to see if they match. If a match exists, the selected request is prevented from being memory executed.

13 Claims, 8 Drawing Sheets

MEMORY REQUEST INTERLOCK

BACKGROUND

This invention generally relates to computer systems. In particular, the invention relates to memory controllers in computer systems.

Memory controllers are used to control the flow of data between clients of a computer system, such as a central processing unit (CPU) and graphics controller, and the memory, such as dynamic RAM (DRAM). These controllers typically buffer read and write requests from the clients to the memory.

Figure 1:
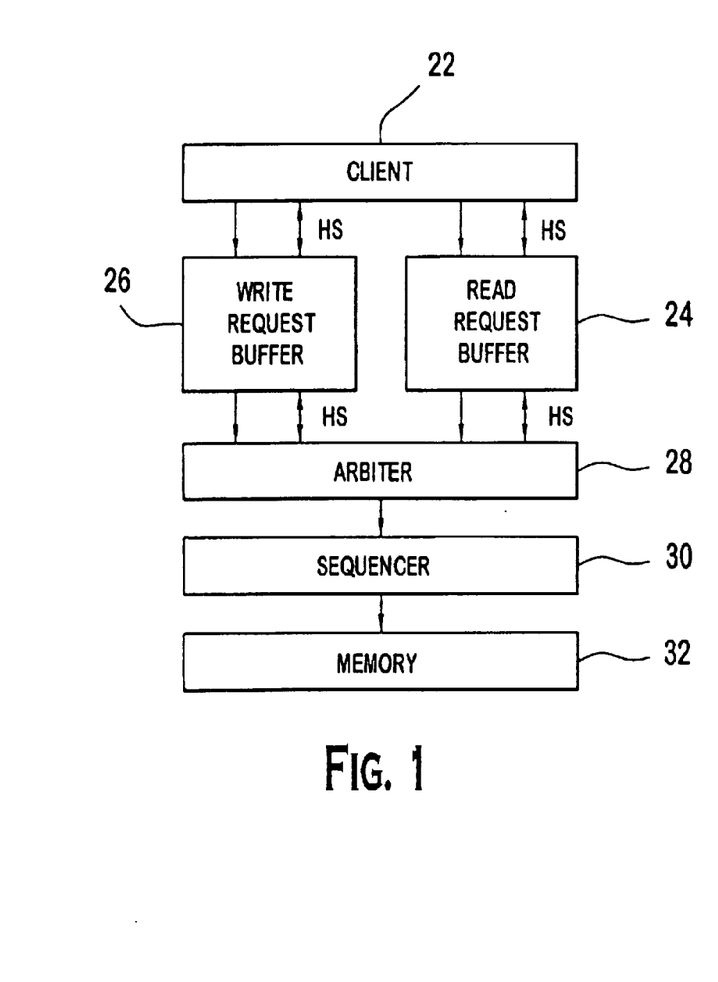
FIG. 1 is a simplified memory controller.

A typical controller is illustrated in FIG. 1. A client 22 desires for various reads and writes to be performed to a memory 32. The write requests are sent to a write buffer 26 and the read requests are sent to a read buffer 24. To assure that the read and write buffers 24, 26 can handle the requests, handshaking is performed between the buffers 24, 26 and the client 22. An arbiter 28 selects read and write requests from the corresponding buffer 24, 26 to be performed in a selected order. The buffers 24, 26 handshake with the arbiter 28 to determine when requests should be sent to the arbiter 28.

After the arbiter 28 selects the requests, the selected requests are sent to the sequencer 30 for execution. The sequencer 30 processes the requests in the received order and generates all the timing information for accessing the memory 32.

Typically, the arbiter 28 does not take the read and write requests in the order that they were received by the buffers 24, 26. The arbiter 28 may select the requests which most efficiently use the memory 32. For instance, the arbiter 28 may select a group of read requests prior to a single write request. This situation may occur when all the read requests were associated with a page currently active in the memory device. Performing all of these read requests first avoids a page miss penalty. Another situation where out of order execution occurs is when the read buffer 24 has significantly more pending requests than the write buffer 26, or vice versa.

Performing read and write requests out of order to the same memory address is usually undesirable. In many systems, different processes or even the same process performing sequential tasks, can share data only by writing to and reading from the system or video memory. In this situation, reads and writes to the same location need to be executed in the order received by the buffers 24, 26. A basic memory controller device, as shown in FIG. 1, cannot assure a proper execution order. As a result, incorrect read data is returned to the client 22.

Accordingly, it is desirable to provide a memory controller which eliminates these erroneous data transfers.

SUMMARY

A memory controller for use in a computer system. The controller has a buffer having an input configured to receive read and write requests. Each request has an associated memory address. For a selected received request, prior received requests out of a set of the received requests are determined. For each determined prior received request, that request's memory address is compared to the selected request's memory address to see if they match. If a match exists, the selected request is prevented from being memory executed.

DETAILED DESCRIPTION OF THE PREFERRED EMBODIMENTS

Figure 2:
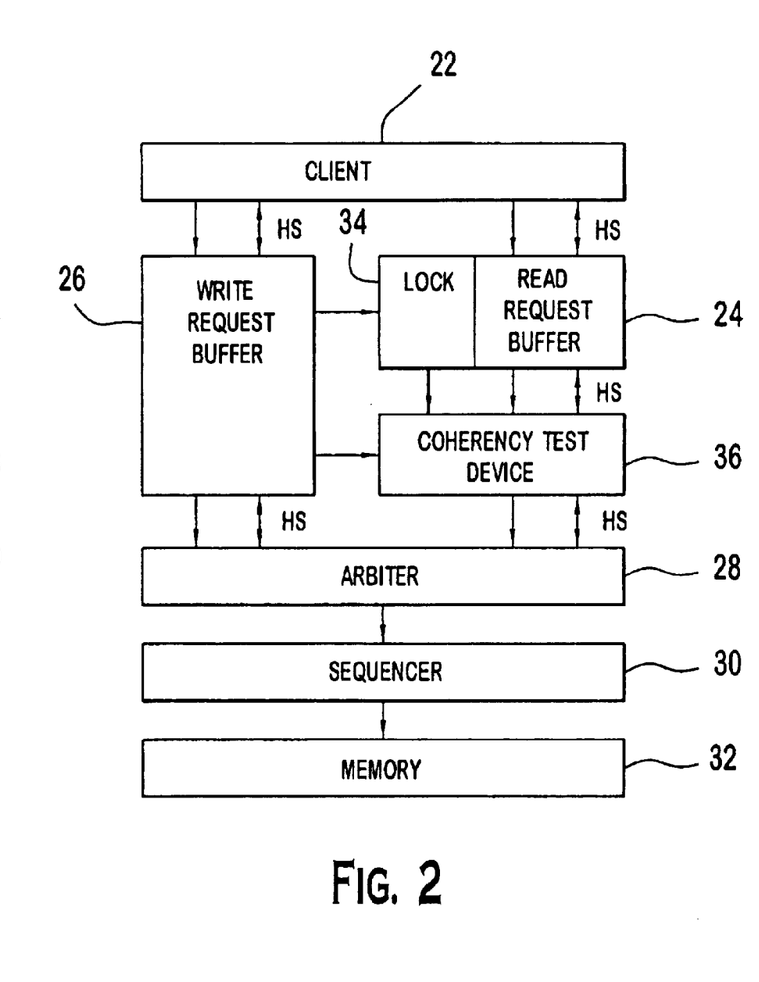
FIG. 2 is a simplified memory controller preventing read requests until prior write requests are arbited.

FIG. 2 is a simplified memory controller for controlling read requests in a computer system. A client 22, such as a central processing unit (CPU) or video process, requests reads and writes to memory addresses. The read requests are loaded into a read buffer 24, such as a first in first out (FIFO). To prevent data from being sent to an overloaded buffer 24, handshaking is performed between the read buffer 24 and the client 22.

One type of handshaking has the client 22 send a ready to send (RTS) signal to the buffer 24. If the buffer 24 can receive the read request, the buffer 24 sends a ready to receive (RTR) signal to the client 22. After the client 24 receives the RTR signal, the read request is sent. If the RTR is not sent to the client 22, the read request is not sent. The read requests typically include the memory address of the data to be read, as well as a tag code used to distinguish the request from other read requests.

The write requests are loaded into a write buffer 26, such as a FIFO. Handshaking is also performed between the write buffer 26 and the client 22. The write requests typically include the data to be written into memory 32 and the memory address for that data to be written. Prior to sending write requests to the arbiter 28, handshaking is performed between the write buffer 26 and the arbiter 28.

The write and read requests are stored in the write and read request buffers 26, 24 for selection by the arbiter 28. The arbiter 28 selects the requests based on a predetermined algorithm. The algorithm may be based on memory efficiency rules, client priorities or other factors. Although access to the memory 32 is shown as being through a single channel, one, two or multiple channels may be utilized based on the system requirements. The selected requests are sent to the sequencer 30 for execution. The sequencer 30 processes the requests in the received order and generates all the timing information for accessing the memory 32. Information exchanged between the sequencer 30 and the memory 32 includes memory addresses, strobes, common address strobes and write enables.

To prevent read requests from being performed before previously buffered write requests, a lock maintenance device (lock) 34 and a coherency test device (coherency device) 36 are utilized. The lock 34 determines whether there are any previously buffered write requests in the write buffer 26 prior to sending a read request to the arbiter 28. If there are, the coherency device 36 determines if any of the previous write requests have the same address as that read request. If any previous write requests have the same address, that read request is prevented from being passed to the arbiter 28.

One approach to tracking the receipt of read and write requests uses a free-running counter in the memory controller. As each new request is received by the input buffers 24, 26, the current value of the counter is captured and attached to the request as a time stamp. The memory controller determines the order of all pending requests by comparing the time stamps. In such a system, the size of the counter will typically be large. This approach is undesirable when the system clock rate is much faster than the rate of receipt of requests.

This system also typically requires special circuits to handle the condition when the counter "rolls over" from its maximum value to its minimum value.

Another approach uses the existing controllers read and write pointers. Each read and write request in the corresponding buffer 24, 26 has an associated buffer address. A write buffer controller maintains a write buffer read pointer and a write buffer write pointer to track which locations in the write buffer contain pending write requests. Each time a new request is received by the write buffer 26, the request is placed in the location pointed to by the write buffer's write pointer and then the write buffer's write pointer is incremented. When a request is accepted by the arbiter 28, the request is taken from the write buffer location referenced by the write buffer's read pointer and then the write buffer's read pointer is incremented. The pending write requests are those stored between the write buffer's read and write pointers as illustrated in FIG. 3.

The lock 34 monitors the write buffer's read and write pointers. Each entry in the read buffer 24 has a separate lock pointer. When each read request is received by the read buffer 26, the lock 34 captures the current value of the write buffer's write pointer as a lock pointer. Additionally, a write request buffer status flag which indicates whether the buffer 26 is full is captured.

Figure 3:
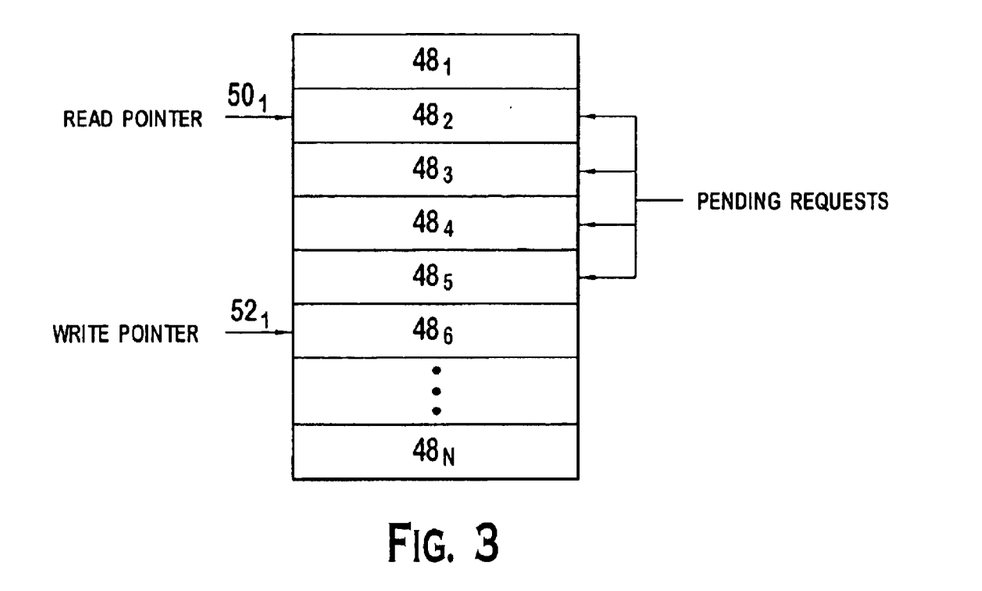
FIG. 3 is an illustration of a write and read pointer in a buffer.
Figure 4:
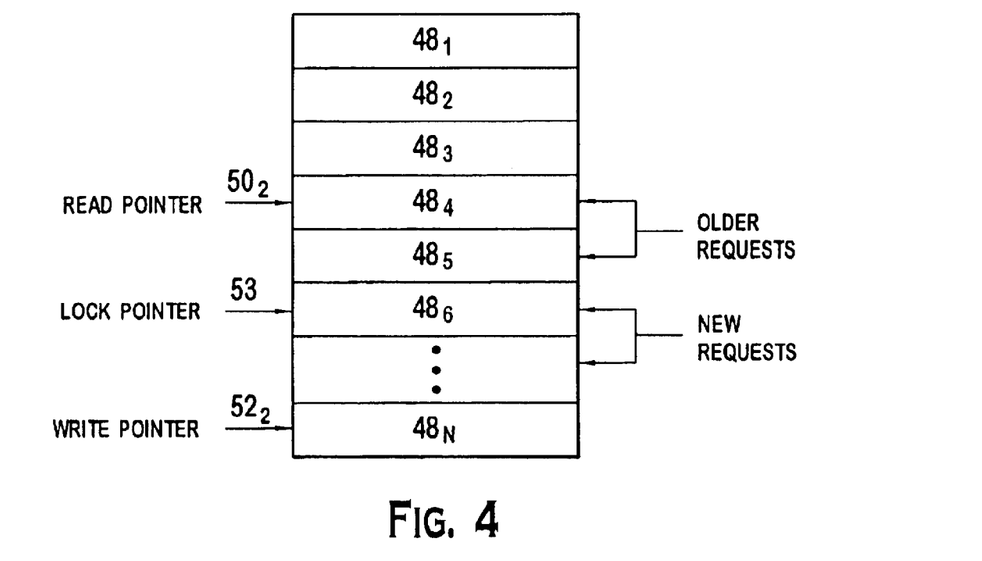
FIG. 4 is an illustration of a write, read and lock pointer in a buffer.

As illustrated in FIGS. 3 and 4, while read requests are pending in the read buffer 24, the lock 34 monitors the activity in the write buffer 26 to track which of the pending write buffer requests are older than the read requests of interest. For instance, a read request is accepted by the read buffer 24 when the write buffer's state is as shown in FIG. 3. The lock pointer 53 is assigned a value pointing to location $48_6$ of the write buffer 26. This location $48_6$ is where the write buffer's write pointer $52_1$ currently points. As the write buffer's write pointer $52_2$ increments, as shown in FIG. 4, due to received write requests, the write pointer advances to location $48_N$. But since the lock pointer 53 remains fixed at $48_6$, it is known that the new pending write requests in locations $48_6$ through $48_{N-1}$ were received after the read request of interest. The lock 34 ignores these locations for that read request. Additionally, since the read pointer has advanced to location $48_4$, the lock disregards locations $48_2$–$48_3$. Those write requests were already arbited. Using the read, write and lock pointers, the lock determines the pending write requests older than the read request of interest. In this case, write requests in locations $48_4$ and $48_5$ are older.

If the lock pointer 53 and the write buffers read pointer $50_2$ point to the same location, this situation indicates either every or no location in the write buffer 26 contained an older pending request. The capture of the write buffer full indicator allows the lock 34 to distinguish between these two conditions.

The write buffer's read pointer $50_1$, $50_2$ will move as write requests are accepted by the arbiter 28. Once the write buffer's read pointer catches the lock pointer 53, indicating that no pending write requests are older than the read request of interest, an indicator that coherency testing is necessary is cleared, such as a status flag.

If there are any older write requests than a read request of interest, the coherency device 36 determines whether any of the older write requests have the same memory address as the read request. The lock 34 forwards lock pointers 53 and status flags for that read request to the coherency device 36. The coherency device 36 uses that information to determine the older pending write requests. The read request may be arbited, as an out-of order transaction, as long as the memory address for that read request is not the same as any older pending write requests.

In some systems, the client 22 may be running at a different clock frequency than the arbiter 28. Typically in such systems, clock domain crossing is performed in the read and write request buffers 24, 26. The write pointers are maintained on the client's clock domain and the read pointers are maintained on the arbiter's clock domain.

Since the lock 34 requires access to both read and write pointers, in such systems, it typically works in both clock domains. One approach to cross domains is to keep the lock pointers 53 in the client's clock domain and have the status flags on the arbiter's clock domain. This approach allows the lock pointer captures of the write request buffer 26 to occur during handshake between the client 22 and the read request buffer 24, which are in the client clock domain. The status flags are updated each time the write buffer read pointer is updated, which is on the arbiter clock domain.

The status flag circuitry is also dependent on the lock pointer, so there may be a potential problem when the lock pointer is in the client clock domain. However, since the lock pointer does not change after its initial assignment, it may be suitable for use in the arbiter clock domain. The lock 34 only needs to determine when the lock pointer 53 has received its initial assignment which is typically the same time that the read request is received by the read buffer 24. An advantage to such a system is the read buffer 24 uses the same circuits for synchronizing its own write pointer to the arbiter clock domain for the lock pointer synchronization. This approach eliminates synchronization error, since the arrival of the new lock pointer 53 is at the same time as arrival of the read request.

Figure 5:
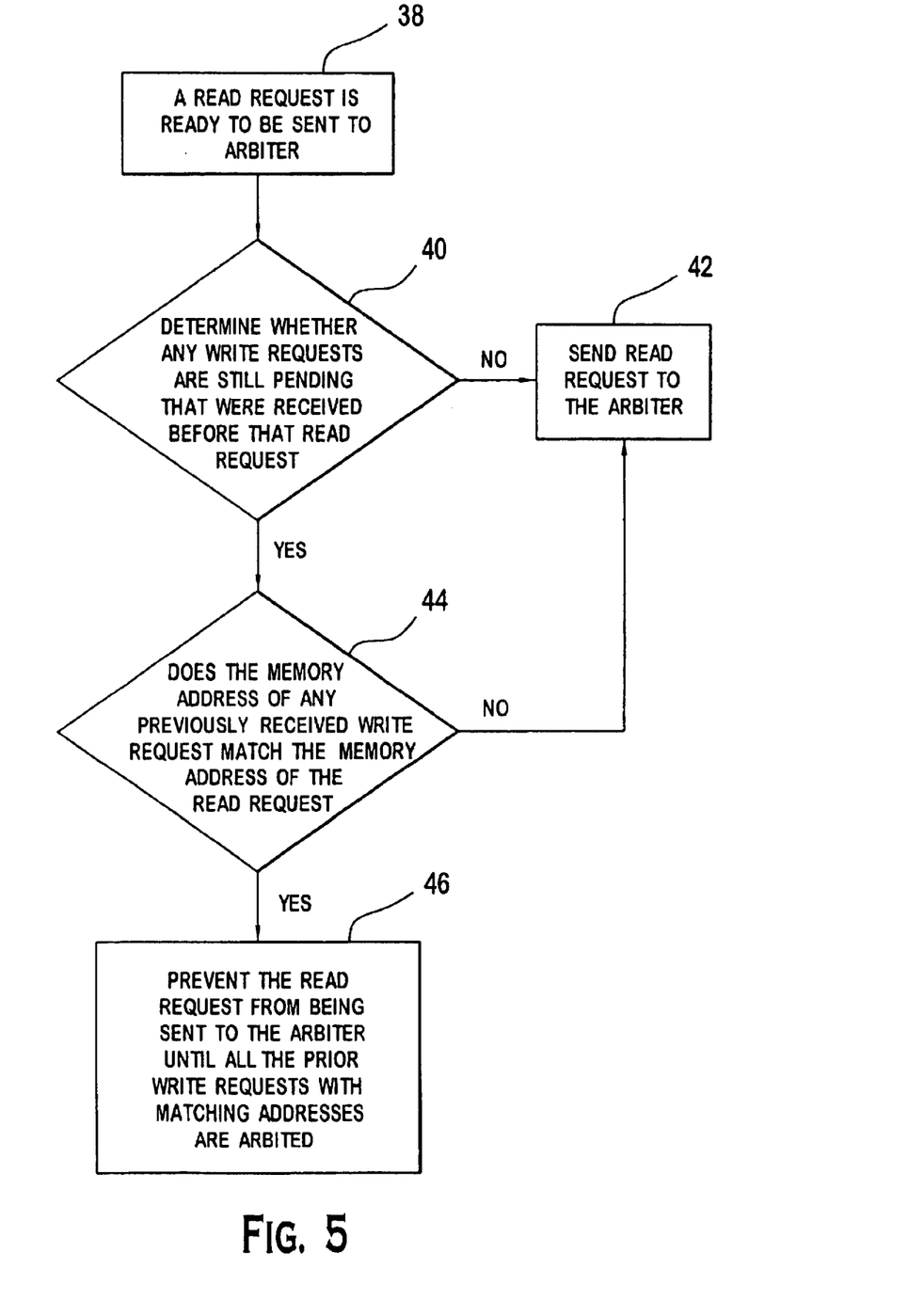
FIG. 5 is a flow chart for preventing read requests until prior write requests are arbited.

FIG. 5 is flow chart of preventing read requests from being arbited due to prior write requests to the same memory address. A read request is about to be sent to the arbiter 28, 38. If no write requests were received prior to that read request, 40, that read request is sent to the arbiter 28, 42. If there are prior write requests, 40, the lock 24 sends the corresponding write pointers to the coherency device 36.

The coherency device 36 compares the memory address of the sent pointers to the memory address of that read request, 44. If none of the sent pointer addresses match the read address, the read request is sent to the arbiter 28, 42. If any of those write requests' addresses match the read request address, the lock 34 prevents that read request from being sent to the arbiter 28. The lock 34 continues to prevent the read request from going to the arbiter 28 until all of the prior write requests with the same address are out of the write buffer 26, 46.

One approach for providing handshaking between the read buffer 24 and the arbiter 28 is to use the coherency device 36 as shown in FIG. 2. The read buffer 24 handshakes with the coherency device 36 which in turn handshakes with the arbiter 28. As a result, the read buffer 24 handshakes with the arbiter 28 via the coherency device 36. To prevent a read request from being arbited 46, the coherency device blocks handshaking between the read buffer 24 and the arbiter 28. Another handshaking approach has the read buffer 24 handshake directly with the arbiter 28.

Figure 6:
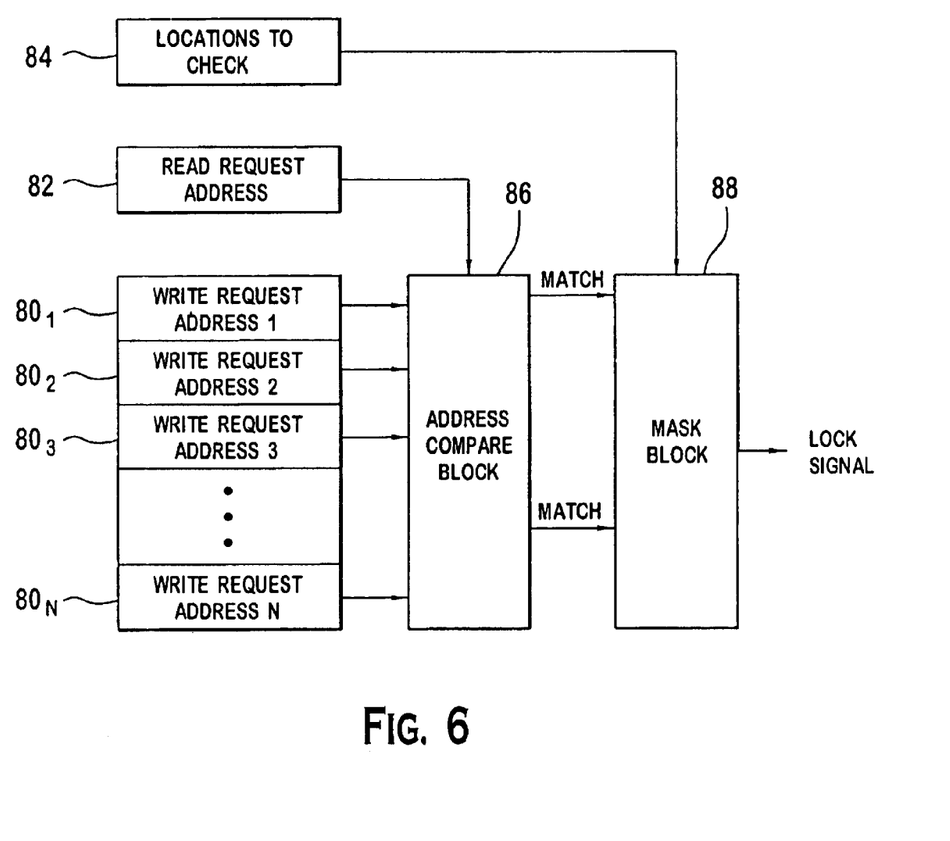
FIG. 6 is a coherency test device.

One type of coherency device 36 is shown in FIG. 6. The read request address 82 comes from the read buffer 24. All of the write requests' addresses $80_1$–$80_N$ in the write buffer 26 are compared to the read request address 82 by the address compare block 86. A match indicator for each matching write request address is supplied to the mask block 88. The lock 34 provides an indication of which buffer locations 84 contain prior write requests, if there is an address match in one of these locations, the mask block 88 asserts a lock signal. The lock signal prevents arbiting of the read request until the lock 34 determines that the location causing the address match no longer contains a pending prior write request.

Figure 7:
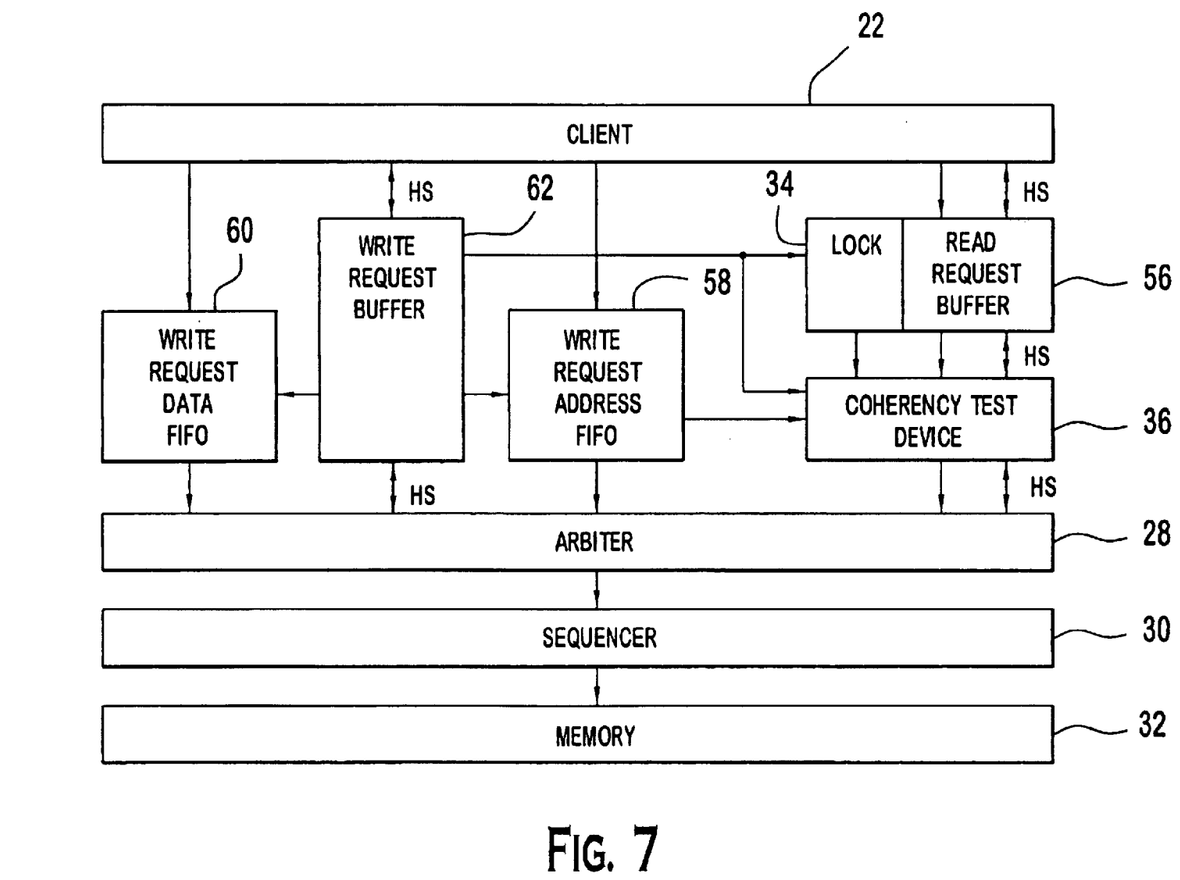
FIG. 7 is a simplified memory controller for a video process.

FIG. 7 illustrates a read request comparitor memory control circuit for use in a video processor. The controller of FIG. 7 has high applicability for use with a 3D graphics engine client, 64 bit processing, a client using a clocking rate of 166 megahertz (MHz) and an external memory using a clocking rate of 200 MHz. The write buffer has two FIFOs, a write request data FIFO (data FIFO) 60 and a write request address FIFO (address FIFO) 58. The address FIFO 58 holds the address and swap fields of the write requests. To allow the contents of the address FIFO to be visible to the coherency test device 36, the system may use devices such as flip-flops or latches. The data FIFO 60 holds the data for each write request. If the contents of the data FIFO are not required by any other process, this FIFO may be implemented using a dual-port memory. The address and data FIFOs 58, 60 receive the write requests from the client 22 and send them to the arbiter 28.

A common write request FIFO controller (FIFO controller) 62 is used to manage the data and address FIFOs 58, 60. One of the FIFO controller tasks is to perform handshaking with the client 22 and the arbiter 28. Another of the FIFO controller tasks is to provide write pointers to the lock 34 and coherency device 36.

The read request buffer uses a read request FIFO (read FIFO) 56. The read FIFO 56 performs handshaking with both the client 22 and the coherency device 36. The coherency device 36 also handshakes with the arbiter 28. Read requests are sent to the read FIFO 56 from the client 22. The read requests are subsequently sent from the read FIFO 56 via the coherency device 36 to the arbiter 28.

The lock 34 is coupled to the read FIFO 56 to selectively allow read requests to be sent to the arbiter 28. Both the lock 34 and the coherency device 36 receive write request pointers from the FIFO controller 62. The coherency device 36 receives the write request addresses for the corresponding write request pointers from the address FIFO 58.

Figure 8:
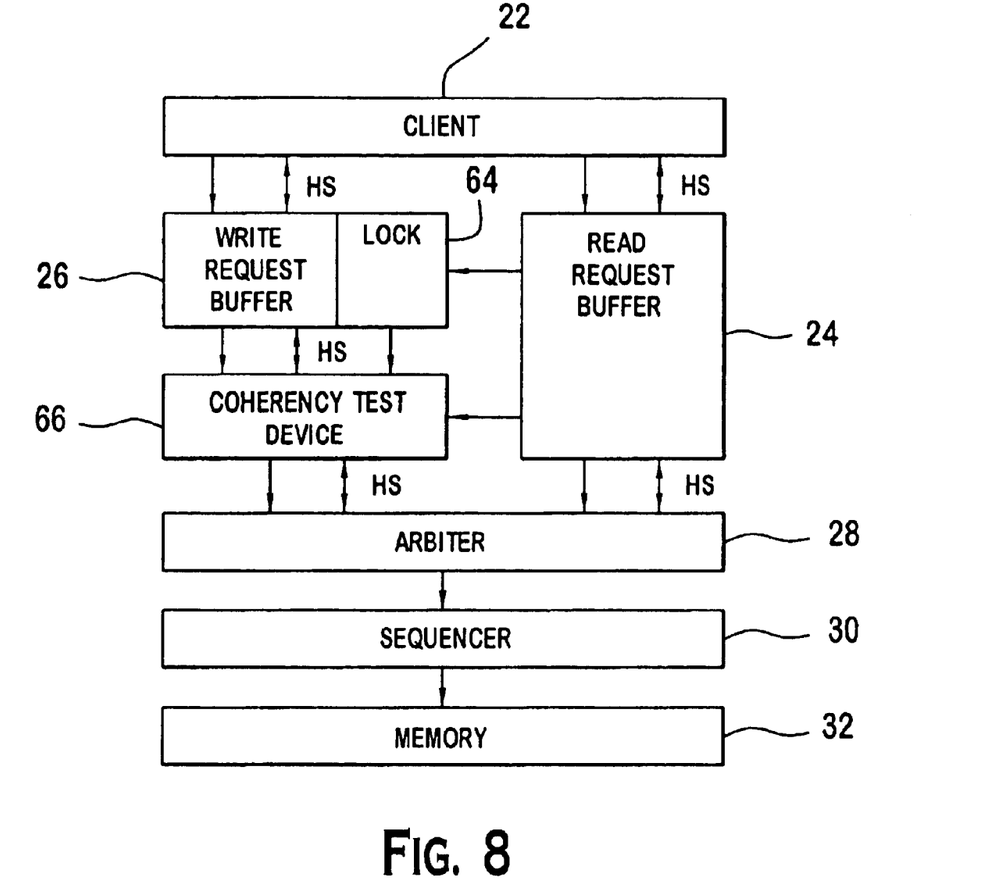
FIG. 8 is a simplified memory controller preventing write requests until prior read requests are arbited.

FIG. 8 is a simplified memory controller for controlling write requests. Instead of preventing read requests from being sent to the arbiter 28, write requests may be prevented from being sent, if required. If for each write request, all of the prior read requests having the same address are send before that write request, no write requests will occur before a prior read request for a particular address.

The read buffer 24 receives requests from the client 22 and passes them to the arbiter 28. The write buffer 26 receives write requests from the client 22. However, a lock 64 and coherency device 66 are used to prevent write requests from being sent to the arbiter 28 until all of the prior read requests are sent. The read request pointers are sent from the read buffer 24 to the lock 64. The lock 64 determines which read pointers were received prior to each write request. These read pointers are passed to the coherency device 66 to determine whether any prior read addresses match the write address. A coherency device 66 similar to FIG. 6 may be used. As a result, write requests are blocked until prior read requests for the same address are arbited.

Figure 9:
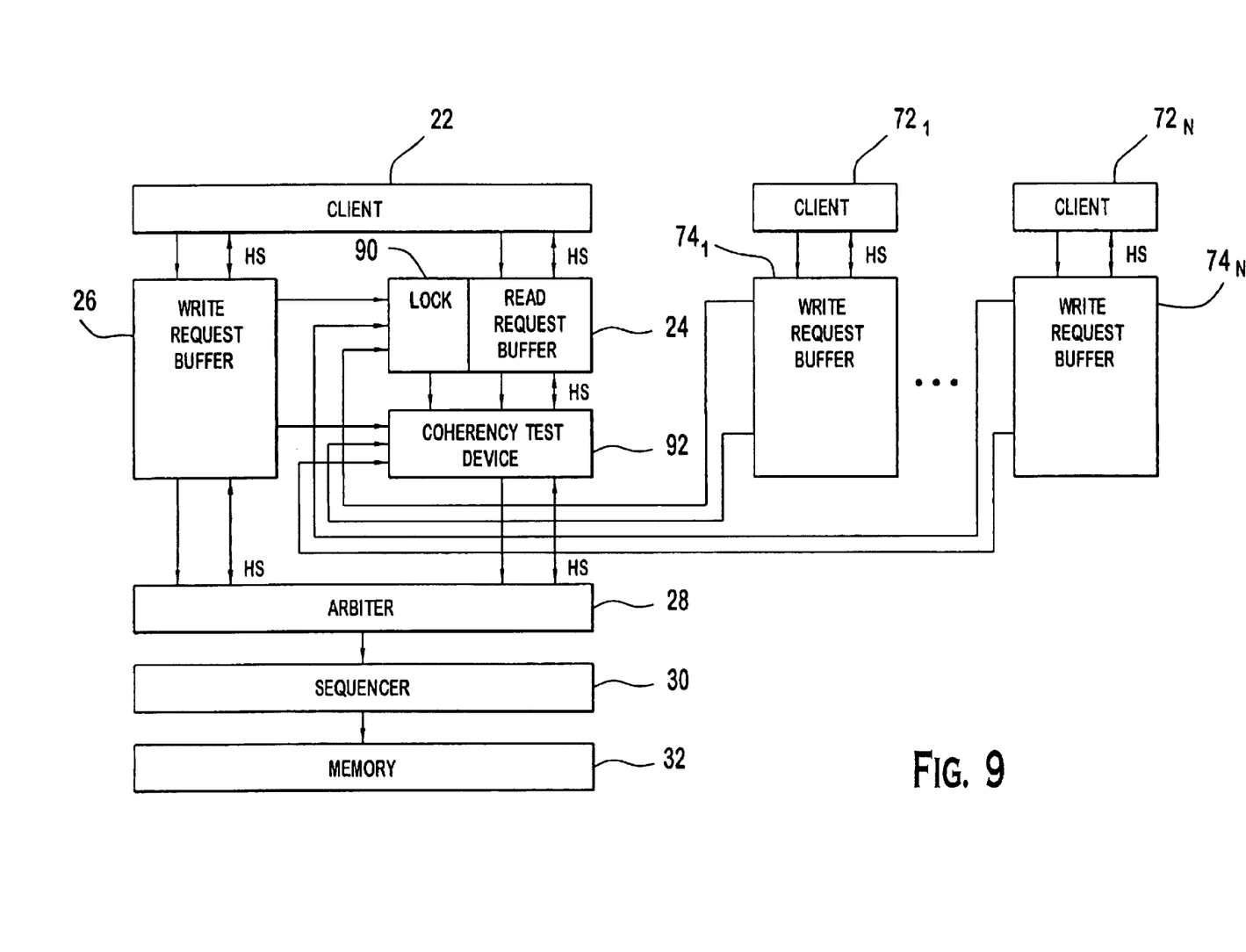
FIG. 9 is a simplified memory controller preventing read requests until prior write requests are arbited in a multiple client system.

The same principles may be expanded to a multiple client environment as shown in FIG. 9. Although the multi-client environment is shown with respect to controlling read requests, an analogous approach may be used to control write requests.

Each client 22, $72_1$–$72_N$ reads and writes to a common memory 32. For a particular client 22, $72_1$–$72_N$, in addition to the lock 90 receiving write pointers from its write buffer 26, the lock receives pointers from each clients' write buffer $74_1$–$74_N$. The lock 90 determines which pointers from all the clients 22, $74_1$–$74_N$ are prior to the read requests in its read buffer 24. The simple design of the coherency device of FIG. 6 allows it to be easily scalable to handle multiple clients' write request addresses and pointers. When performing a coherency test, the coherency device 92 receives the write addresses for the determined pointers from each client's write buffer 26, $74_1$–$74_N$. As a result, the lock 90 and coherency device 92 can check for prior write requests having the same address as a read request for multiple clients 22, $72_1$–$72_N$.

Figure 10:
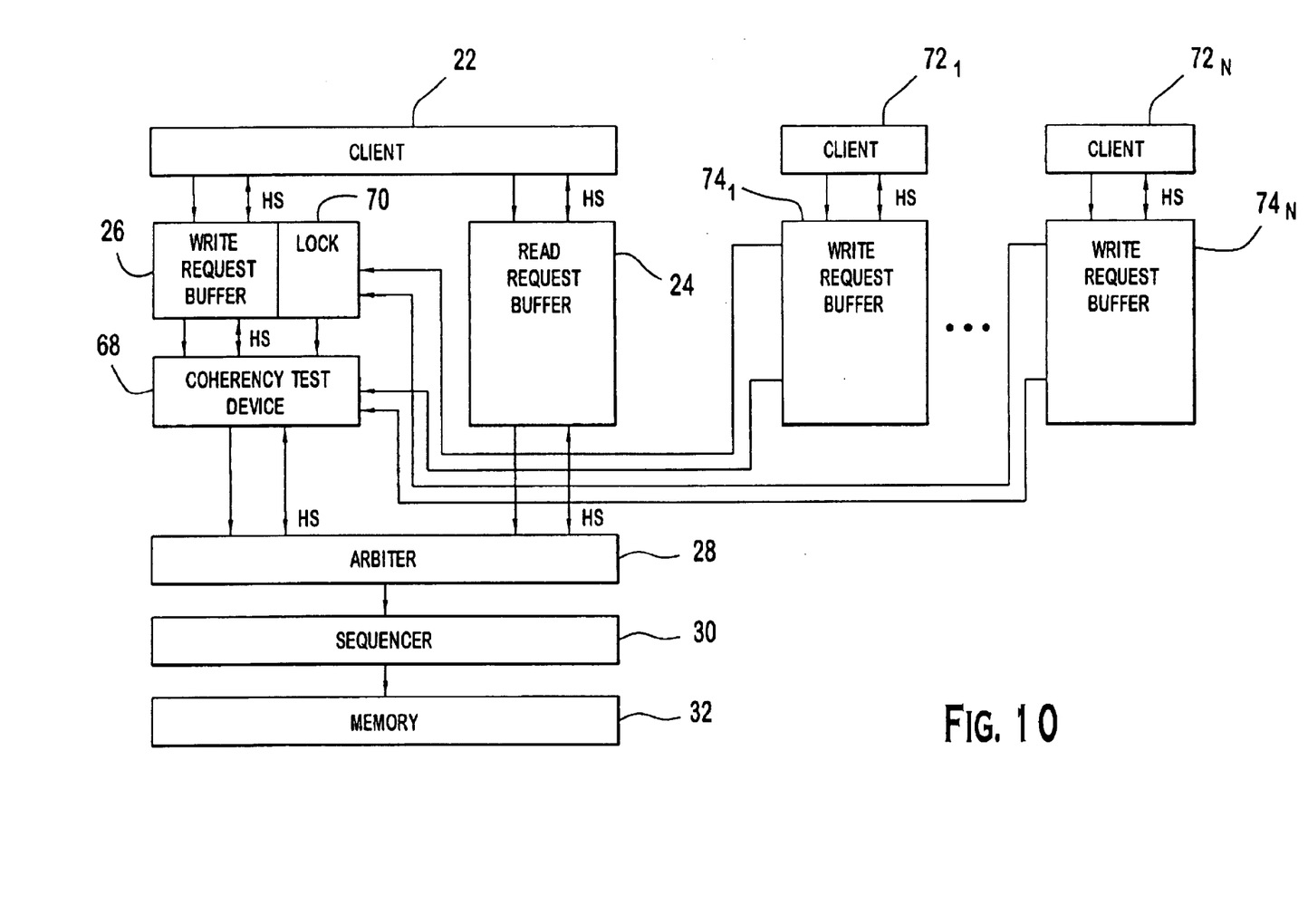
FIG. 10 is a simplified memory controller preventing write requests until prior write requests are arbited in a multiple client system.

FIG. 10 illustrates a write request being prevented by prior write requests. Although FIG. 10 illustrates the use of prevented write requests over multiple clients 22, $72_1$–$72_N$, an analogous approach may be applied to a write buffer 26 for a single client 22 not utilizing a FIFO where write requests may not be arbited in received order. If write requests are not performed in proper order, older write requests may overwrite newer requests leading to erroneous data reads. As shown in FIG. 10, a lock 70 and a coherency device 68 are used to prevent a write request from being arbited. The lock 70 receives pointers from other clients' write buffers $74_1$–$74_N$. The lock 70 determines which pointers were prior to each write request in its write buffer 26. When performing a coherency test, the write request addresses from the other client's write buffers $74_1$–$74_N$ for the determined pointers are used. As a result, prior write requests having the same address will be arbited prior to the next write request for this client 22.

Based on the system requirements, these request preventors may be combined. For instance, a system may utilize a multi-client read request preventor for a prior write request as well as a write request preventor for a prior write request. Such a system allows write requests from multiple clients 22, $72_1$–$72_N$ to not be performed out of sequence with a read or a write request to the same address. Other combinations may be used depending on the system requirements.

What is claimed is:

1. A method for controlling execution of read and write requests to a memory in a computer system, each read request is used to execute a read of an associated memory address, each write request is used to execute a write to an associated memory address, the method comprising:

providing a buffer for holding read and write requests;

receiving and holding read and write requests within the buffer;

determining for a selected read or write request within the buffer, prior received requests out of a set of the received read and write requests;

determining matched prior received requests based on in part comparing the associated memory addresses of the determined prior received requests with the selected request's associated memory address; and preventing the selected request from memory execution until the determined matched requests are memory executed; and wherein the step of determining for the selected read request comprises:

providing a read pointer, the read pointer indicating a buffer location of a next write request to be memory executed;

providing a write pointer, the write pointer indicating a buffer location of a next write request to be received by the buffer;

determining for the selected read request prior received write requests based on in part the write pointer and the read pointer location; and providing a lock pointer, the lock pointer indicating a buffer location associated with the write pointer when the selected read request is received; and the determining of prior received write requests is based on in part the write pointer, the read pointer and lock pointer location.

2. The method of claim 1 wherein the step of determining prior received requests comprises:

time stamping each received request at reception; and determining for the selected read or write request within the buffer, the prior received requests based on in part the prior received requests' time stamps.

3. The method of claim 1 wherein the selected request is a read request and the set of received requests are all of the received write requests.

4. The method of claim 1 wherein the step of determining for the selected read request further comprises:

providing a status flag, the status flag indicating whether the buffer is full; and the determining of prior received write requests is based on in part the write pointer location, the read pointer location, the lock pointer location and the status flag.

5. The method of claim 1 wherein the selected request is a write request and the set of received requests are all of the received read requests.

6. The method of claim 5 wherein the step of determining for the selected write request comprises:

providing a read pointer, the read pointer indicating a buffer location of a next read request to be memory executed;

providing a write pointer, the write pointer indicating a buffer location of a next read request to be received by the buffer; and determining for the selected write request prior received read requests based on in part the write pointer and the read pointer location.

7. The method of claim 6 wherein the step of determining for the selected write request further comprises:

providing a lock pointer, the lock pointer indicating a buffer location associated with the write pointer when the selected write request is received; and the determining of prior received read requests is based on in part the write pointer, the read pointer and the lock pointer location.

8. The method of claim 7 wherein the step of determining for the selected write request further comprises:

providing a status flag, the status flag indicating whether the buffer is full; and the determining of prior received read requests is based on in part the write pointer location, the read pointer location, the lock pointer location and the status flag.

9. The method of claim 1 wherein the selected request is a write request and the set of received requests are other received write requests.

10. The method of claim 1 wherein a requesting clients and a arbiter are operating at different clocking rates, the method further comprising synchronizing a client requests to a arbiter clock domain.

11. A memory controller for use in a computer system, the memory controller comprising:

a buffer having an input configured to receive read and write requests and for holding the received read and write requests, each read request is used to execute a read of an associated memory address and each write request is used to execute a write to an associated memory address;

a lock maintenance device for determining for a selected received read or write request prior received requests out of a set of the received read and write requests and for preventing the selected request from being sent to an arbiter until determined matched requests are sent to the arbiter;

a coherency test device for determining the determined matched requests based on in part comparing the associated memory addresses of the determined prior received requests with the selected request's associated memory address; and the arbiter for selecting from the held read and write requests in the buffer a next request for memory execution; wherein the selected request is a write request and the set of received requests are all of the received read requests.

12. The memory controller of claim 11 further comprising a sequencer operatively coupled to the arbiter, the sequencer for executing the read and write requests selected by the arbiter.

13. A memory controller for use in a computer system, the memory controller comprising:

a buffer having an input configured to receive read and write requests and for holding the received read and write requests, each read request is used to execute a read of an associated memory address and each write request is used to execute a write to an associated memory address;

a lock maintenance device for determining for a selected received read or write request prior received requests out of a set of the received read and write requests and for preventing the selected request from being sent to an arbiter until determined matched requests are sent to the arbiter;

a coherency test device for determining the determined matched requests based on in part comparing the associated memory addresses of the determined prior received requests with the selected request's associated memory address; and the arbiter for selecting from the held read and write requests in the buffer a next request for memory execution; wherein the selected request is a write request and the set of received requests are other received write requests.

* * * * *